United States Patent [19]

Ando

[11] Patent Number: 4,587,648
[45] Date of Patent: May 6, 1986

[54] OPTICAL DISK

[75] Inventor: Hideo Andō, Hino, Japan

[73] Assignee: Tokyo Shibaura Denki Kabushiki Kaisha, Kawasaki, Japan

[21] Appl. No.: 521,074

[22] Filed: Aug. 8, 1983

[30] Foreign Application Priority Data

Aug. 10, 1982 [JP] Japan .............................. 57-138033
Aug. 26, 1982 [JP] Japan .............................. 57-146859
Aug. 26, 1982 [JP] Japan .............................. 57-146860

[51] Int. Cl.$^4$ .............................................. G11B 7/00
[52] U.S. Cl. ...................................... 369/275; 369/109
[58] Field of Search .................. 369/109, 275, 111, 93, 369/94, 95; 346/76 L, 135.1

[56] References Cited

U.S. PATENT DOCUMENTS

| 4,310,916 | 1/1982 | Dil | 369/109 |
|---|---|---|---|
| 4,325,135 | 4/1982 | Dil et al. | 369/275 |
| 4,326,282 | 4/1982 | Verboom et al. | 369/275 |
| 4,423,502 | 12/1983 | Dil | 369/275 |
| 4,455,632 | 6/1984 | Braat | 369/109 |

FOREIGN PATENT DOCUMENTS

| 3131212 | 3/1982 | Fed. Rep. of Germany . | |
| 2321164 | 3/1977 | France | 369/109 |
| 2435781 | 4/1980 | France . | |
| 2441237 | 6/1980 | France . | |
| 56-90437 | 7/1981 | Japan | 369/275 |
| 58-102347 | 6/1983 | Japan . | |
| 2016744 | 9/1979 | United Kingdom . | |
| 2036410 | 6/1980 | United Kingdom | 369/275 |
| 2091028 | 7/1982 | United Kingdom . | |

OTHER PUBLICATIONS

Patents Abstracts of Japan, vol. 7, No. 206 (p-222)(1351), Sep. 10, 1983.
Proceedings of SPIE-The International Society for Optical Eng., Jun. 8th-9th, 1983, Arlington, Virginia, vol. 421, pp. 85-90.
SPIE-The International Society for Optical Engineering, Wash., US; Ryoichi Iamanaka et al.: "Optical Disc Memory System", p. 86, par. 4-p. 87, par. 1; FIGS. 2-7.
IEEE Spectrum, vol. 16, No. 8, Aug. 1979, pp. 26-32, IEEE, New York, US; Bulthuis et al.: "Ten Billion Bits on a Disk".
Patents Abstracts of Japan, vol. 5, No. 161 (p-84)(833), Oct. 16th, 1981; & JP-A-5690437 (Hitachi Seisakusho K.K.) 22-07-1981.

*Primary Examiner*—Donald McElheny, Jr.
*Attorney, Agent, or Firm*—Cushman, Darby & Cushman

[57] ABSTRACT

A light reflective layer is formed on a transparent substrate of an optical disk. Grooves as tracking guides are formed in the light reflective layer along the circumferential direction of the optical disk. A flat surface region is formed between adjacent grooves along the circumferential direction of the optical disk. Preformation pits 6 are formed in the reflective layer of the region. The groove has a depth (preset to be λ/8) which is equal to a width and depth of the preformation pit. The width of the groove is determined to be one-half the laser beam spot diameter.

33 Claims, 11 Drawing Figures

F I G. 7
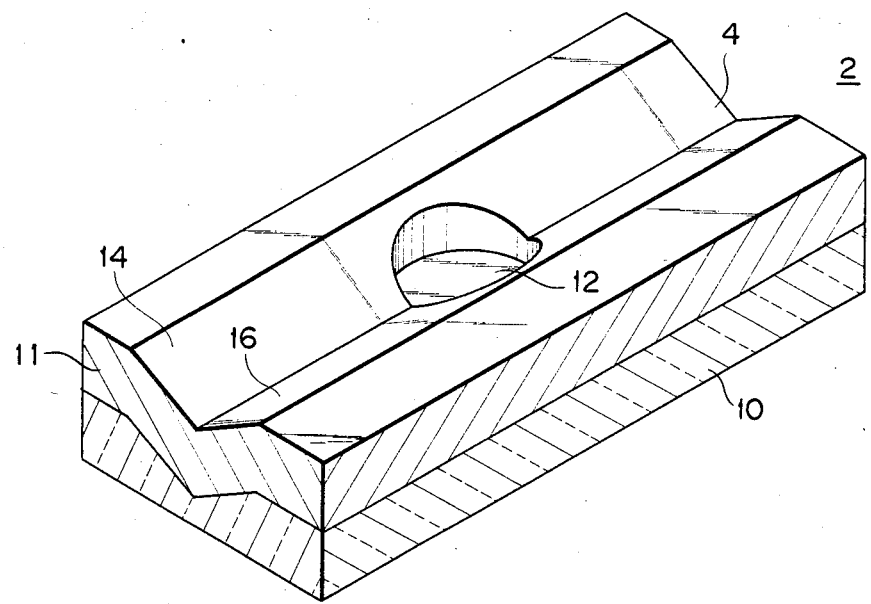
F I G. 8
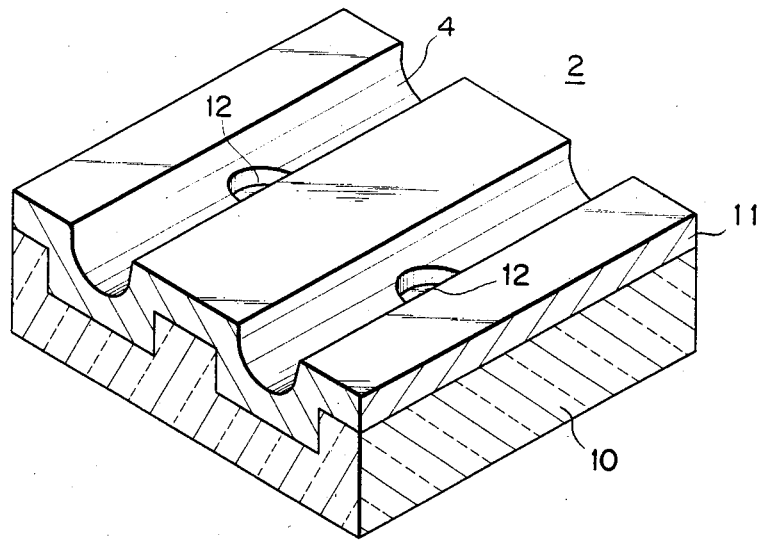

F I G. 9
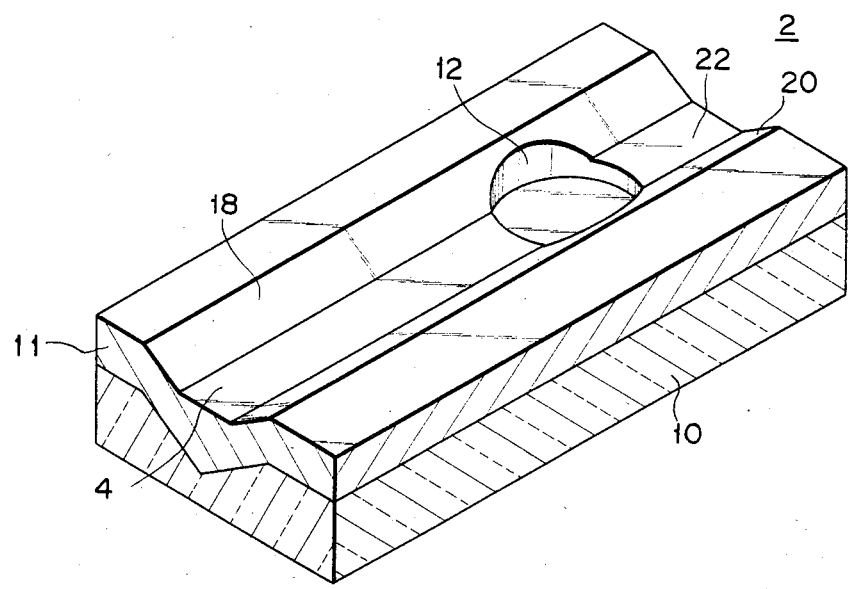
F I G. 10
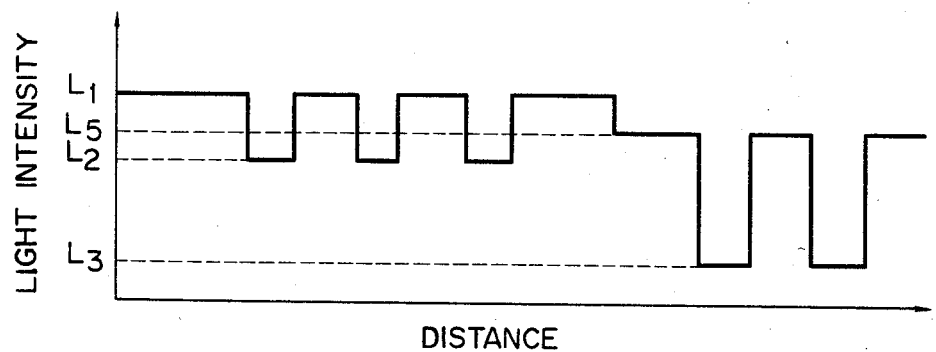

OPTICAL DISK

BACKGROUND OF THE INVENTION

This invention relates to an optical disk capable of reproducing and/or recording information.

Optical disks have been developed which may be applied to various fields as information carriers, from which information may be read out or reproduced and onto which information may be recorded. Such optical disks may include, for example, reproduction-type disks, such as the so-called compact disks for digital audio disk systems; video disks for optical video disk systems; and recording/reproduction-type disks for video file systems or computer output memory systems.

In such optical disks, a tracking guide is preformed before recording information onto the optical disk for high-density recording, and pre-pits or preformation pits, such as codes representing the track number and sector number, are formed to specify the recording or readout region. In a conventional information recording/reproducing system, the track number and sector number are read out from the pre-pits while tracing the tracking guide with a laser beam. Subsequently, information pits are formed in the tracking guide and information is read out therefrom.

In the conventional optical disk, tracking guides are discontinuously or intermittently formed along its circumference. Flat regions between the circumferential tracking guides are defined as regions in which the preformation pits are to be formed. The preformation pits are formed to have a depth of substantially $\lambda/4$ to obtain a highest detection sensitivity, where $\lambda$ is the wavelength of the laser beam. In the conventional optical disk of the type described above, an area having the tracking guide can be properly traced with the laser beam. However, a preformation pit area between adjacent tracking guides is traced using the preformation pit array as the tracking guide. However, the laser beam spot tends to deviate from the preformation pit array. This is because a symmetrical pattern is formed on a detector when the edges of preformation pit array or the center thereof is traced with the laser beam spot and the detector may erroneously detect the edges of the pit array as the center thereof. It is known that preformation pits having a depth of $\lambda/4$ are suitable for properly reading out information from the optical disk, and that the pit array cannot be properly used as the tracking guide.

SUMMARY OF THE INVENTION

It is an object of this invention to provide an optical disk which allows proper tracing of a tracking guide and a array of preformation pits as the tracking quide and in which code information can be read out from preformation pits with a sufficient sensitivity.

According to an aspect of the present invention, there is provided an optical disk comprising a disk plate having a light reflective layer, at least two tracking guides formed on said light reflective layer of said disk plate and respectively defined by a groove having a predetermined depth $h_0$ so as to extend along a circumferential direction of said optical disk, a flat light reflective region formed between said at least two tracking guides along the circumferential direction, and first pits formed by said light reflective layer of said disk plate and in said light reflective region and having a depth $h_0$ substantially the same as the predetermined depth $h_0$ of said grooves.

According to another aspect of the present invention, there is also provided an optical disk comprising a disk plate having a light reflective layer, at least two tracking guides formed on said light reflective layer of said disk plate and respectively defined by a ridge having a predetermined height $h_0$ so as to extend along a circumferential direction of said optical disk, a flat light reflective region formed between said at least two tracking guides along the circumferential direction, and a first projection formed on said light reflective layer of said disk plate and in said light reflective region and having a height $h_0$ substantially the same as the predetermined height $h_0$ of said ridge.

According to a further aspect of the present invention, there is also provided a disk plate having a light reflective layer, at least two tracking guides formed on said light reflective layer of said disk plate and respectively defined by a groove having a predetermined depth $h_0$ so as to extend along a circumferential direction of said optical disk, a flat light reflective region formed between said at least two tracking guides along the circumferential direction, recesses formed by said light reflective layer of said disk plate and in said flat region having a depth $h_0$ substantially the same as the predetermined depth $h_0$ of said groove, and flat bridge sections defined between said recesses and said groove and said recess in said flat region, which represent a code information.

BRIEF DESCRIPTIION OF THE DRAWINGS

FIGS. 7, 8 and 9 are perspective views of parts of tracking guides according to modified embodiment of the invention;

FIG. 10 is a graph illustrating the relationship between the distance and the light intensity of a laser beam reflected from the optical disk shown in FIGS. 7, 8 and 9.

DETAILED DESCRIPTION OF THE PREFERRED EMBODIMENTS

Figure 1:
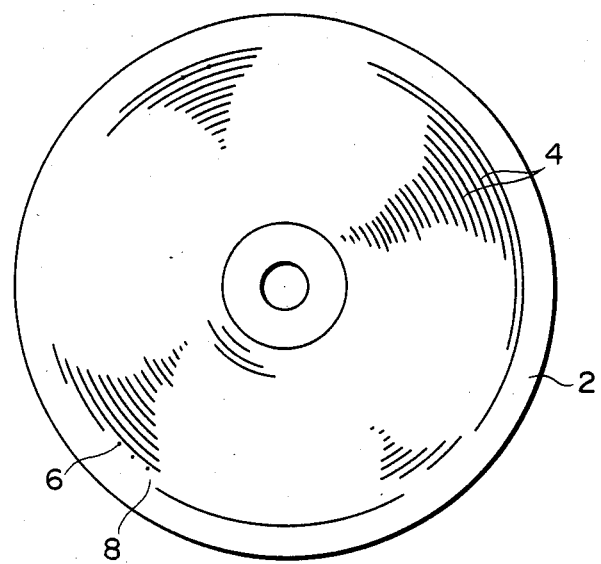
FIG. 1 is a plan view of an optical disk according to one embodiment of this invention.
Figure 2:
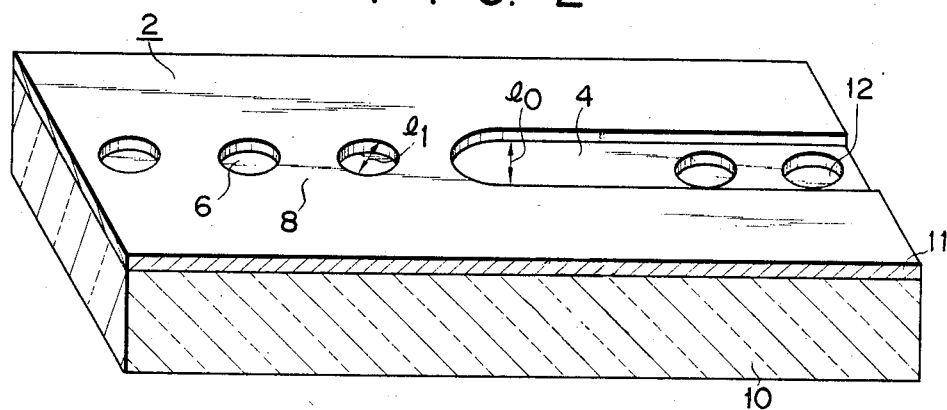
FIG. 2 is a perspective view of part of the optical disk shown in FIG. 1.
Figure 3:
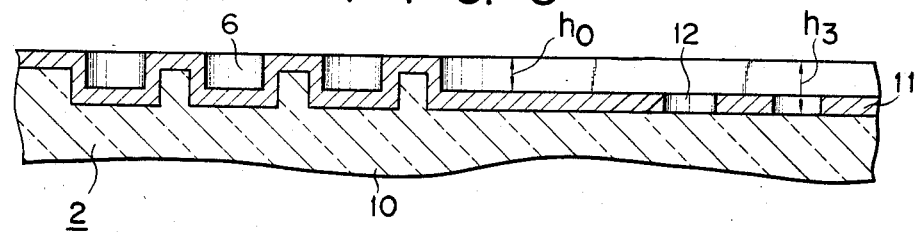
FIG. 3 is a sectional view of said part shown in FIG. 2.
Figure 4:
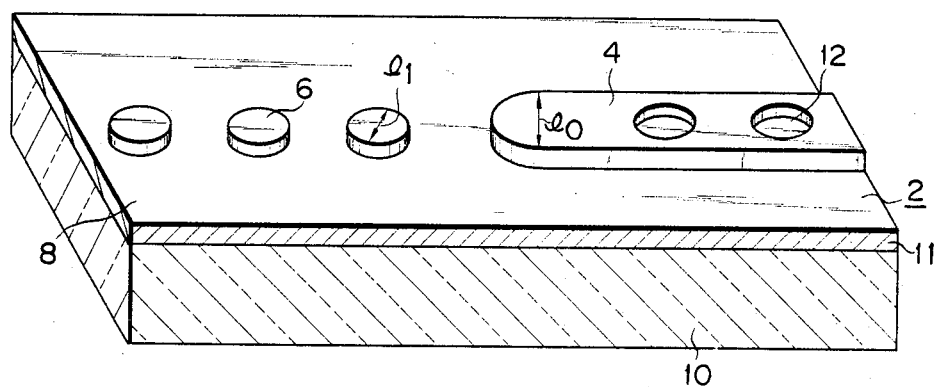
FIG. 4 is a perspective view of part of an optical disk according to another embodiment of this invention.
Figure 5:
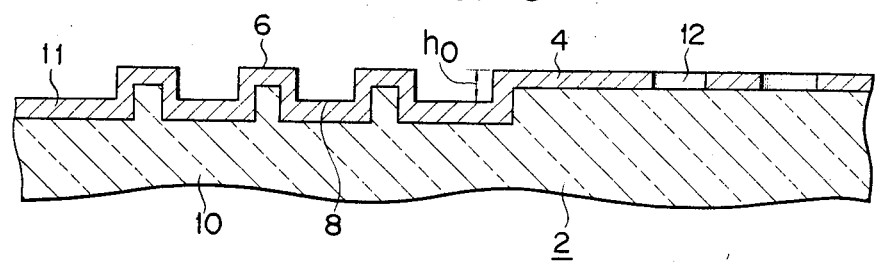
FIG. 5 is a sectional view of said part shown in FIG. 4.

Referring to FIG. 1, there is illustrated an optical disk 2 according to an embodiment of the invention. A spiral tracking guide or concentric tracking guides (grooves or ridges) 4 are formed on the optical disk 2 along its circumferential direction. The tracking guides 4 are not continuously formed but are intermittently formed along the circumferential direction of the optical disk 2. Format segments 6 such as preformation pits or projections indicating track number code and sector number code are formed in a flat or light reflective surface region 8 between adjacent tracking guides 4 along the circumferential direction of the optical disk 2. The tracking guides 4 and the format segments 6 are formed on the optical disk 2 before a video or audio signal is written thereon. As shown in FIGS. 2 and 3, when the format segments 6 and tracking guide 4 are pits and a groove, respectively, the pits 6 and groove 4 are defined by a recording layer 12 formed on a transparent substrate 10 made of a synthetic resin or the like. Similarly, as shown in FIGS. 4 and 5, even if the format segments 6 and tracking guide 4 are projections and a ridge, respectively, the projections 6 and ridge 4 are defined by a recording layer 12 formed on a transparent substrate 10. The recording layer 12 is made of metal, such as Te and Se, which has a low melting point, a low boiling point and a low heat conductivity. The depth $h_0$ of each pit 6 and the groove 4 or a height $h_0$ of each projection 6 and the ridge 4 with respect to the flat surface region 8 is given as follows:

$$\{(2n - 1)/8 - 1/10\}\lambda \leq h_0 \leq \{(2n - 1)/8 + 1/10\}\lambda \quad (1)$$

where n is an integer, and $\lambda$ is the wavelength of the laser beam projecting onto the optical disk 2. The depth or height $h_0$ is so determined according to the following reason. If the height or depth $h_1$ of the tracking guide 4 or the format segment 6 is given by equation (2), a laser beam reflected by the tracking guide 4 or each format segment 6 is detected as a lowest intensity by a so called push-pull method described in U.S. Ser. No. 390,775 filed on June 21, 1982 (now U.S. Pat. No. 4,517,666) and EPC Publication No. 68390 published on June 15, 1983. (The EPC Application No. 82105430.1 was filed on June 21, 1982.)

$$h_1 = \{(2n-1)/4\}\lambda \quad (2)$$

However, if the height or depth $h_2$ of the tracking guide 4 or the format segment 6 is given by equation (3) below, a laser beam reflected by the tracking guide 4 and each format segment 6 is detected by the push-pull method a highest intensity which corresponds to that of light reflected by the flat surface region 8.

$$h_2 = (2n/4)\lambda \quad (3)$$

Therefore, the light intensity levels repeatedly change between the maximum level and the minimum level every time the height or depth of the tracking guide 4 and each format segment 6 is increased at $\lambda/4$. In order to properly trace or track the tracking guide 4 and the array of format segments 6 with the laser beam, the intensity level of light reflected by the tracking guide 4 and the format segments 6 must be set in the range between the highest intensity level and the lowest intensity level. If the reflected light intensity level is set at the highest intensity level, the tracking guide 4 or the array of format segments 6 is not distinguished from the flat surface region 8 with the reflected laser beam. Accordingly, the tracking guide 4 and the array of format segments 6 can not be traced or tracked by the laser beam. However, when the reflected light intensity level is set at the lowest intensity level (i.e., when the depth or height $h_0$ becomes equal to $h_1$), an image of the tracking guide 4 or the array of format segments 6 is not formed on a detector (not shown) for detecting the reflected light beam. Only an interference pattern is symmetrically formed on the detector. Therefore, the tracking guide 4 or the array of format segments 6 cannot be properly traced or tracked with the laser beam. Therefore, the height or depth $h_0$ of the tracking guide 4 and the format segment 6 must fall within the range given by inequality (4) as follows:

$$(n/4)\lambda < h_0 < \{(n+1)/4\}\lambda \quad (4)$$

Various measurement experiments have been conducted under the conditions given by inequality (4). According to these experiments, it is found that the depth or height $h_0$ preferably falls within the range given by inequality (1). In general, the height or depth $h_0$ is set within the range given by inequality (5) below:

$$(1/40)\lambda \leq h_0 \leq (9/40)\lambda \quad (5)$$

The height or depth $h_0$ of the tracking guide 4 and each format segment 6 is most preferably about $\lambda/8$. Widths $l_0$ and $l_1$ of the tracking guide 4 and each format segment 6 may be set to be substantially the same. Each of the tracking guide 4 and each format segments 6 substantially may be formed into the same shape taken along the direction of width thereof. The width $l_0$ is preferably set at about $W_0/2$ (i.e., 0.6 to 0.8 $\mu$m) and the width $l_1$ is preferably set at about $W_0/3$ (i.e., 0.4 to 0.6 $\mu$m) where $W_0$ is defined as the diameter of a region in which the light intensity is $1/e^2$ or more of the maximum light intensity obtained in the light intensity distribution of a beam spot formed on the flat surface region 8 of the optical disk 2. If the width $l_0$ is set at about $W_0/2$, the tracking operation is achived in a stable manner.

The array of format segments 6 formed on the the optical disk 2 is properly traced as the tracking guide. Furthermore, code information indicating the track number, sector number and so on can be read out from the format segments 6. Since each format segment 6 has the height or depth $h_0$, the format segments can be accurately traced with the laser beam, and code information can be properly read out therefrom. When the laser beam spot reaches the tracking guide 4, the tracking guide 4 is properly traced with the laser beam spot. When a light intensity of the laser beam is modulated in accordance with information to be written while the tracking guide 4 is traced with the laser beam spot, the recording layer 11 in the tracking guide 4 is melted, thus forming information pits 12 in the tracking guide 4. An optical system for a tracking servo mechanism and a focus servo mechanism for forming the smallest beam spot on the optical disk is also disclosed in U.S. Ser. No. 390,775 filed on June 21, 1982 (now U.S. Pat. No. 4,517,666) and EPC Publication No. 68390 published on June 15, 1983. (The EPC Application No. 82105430.1 was filed on June 21, 1982). Refer to these specifications for further details.

Figure 6:
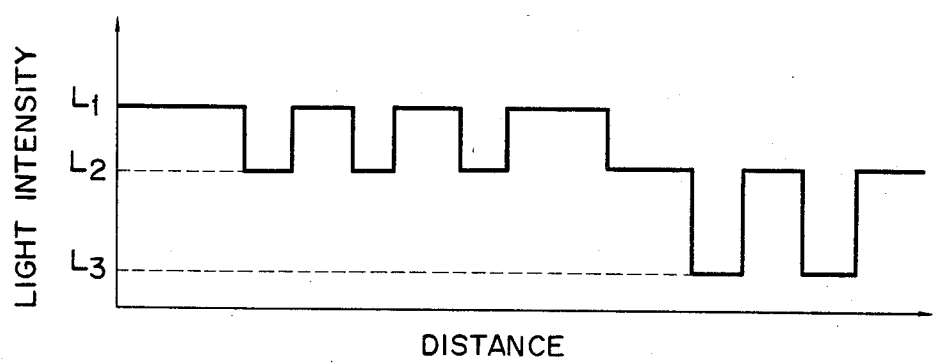
FIG. 6 is a graph illustrating the relationship between the distance and the light intensity of a laser beam reflected from the optical disk shown in FIGS. 2 and 4.

The array of format segments 6 and the tracking guide 4 are traced with the laser beam to read out information from the optical disk 2. Code information and written information are read out from the format segments 6 and the information pits 12, respectively. The intensity of the laser beam reflected by the optical disk in the readout operation is illustrated in FIG. 6. When the laser beam is projected onto the flat surface region 8 of the optical disk 2, a laser beam having a level $L_1$ is reflected by the flat surface region 8. Subsequently, when the laser beam spot is projected onto one of the format segments 6, a laser beam having a level $L_2$ is reflected by this format segment 6. Similarly, when the laser beam is projected onto the tracking guide 4, a laser beam having a level $L_2$ is reflected by the tracking guide 4. However, when the laser beam is projected onto the information pits 12, a laser beam having a level $L_3$ is reflected by the information pits 12. Before the tracking guide 4 is traced with the laser beam spot, the array of format segments 6 is traced therewith. In this condition, the track number for the next track to be traced is read out. As a result, the tracking guide 4 will not be scanned as one of the format segments 6. Furthermore, the level of the laser beam reflected by the array of format segments 6 is substantially the same as that reflected by the tracking guide 4. Hence, the array of format segments 6 can be properly traced in the same manner as the tracking guide.

An optical disk according to modifications of the embodiments of the present invention will be described with reference to FIGS. 7, 8, 9, 10 and 11.

As shown in FIG. 7, the tracking guide 4 may comprise a groove which is defined by a pair of surfaces 14 and 16 so as to have a substantially V-shaped section taken along the transverse direction thereof. As shown in FIG. 8, the tracking guide 4 may be a groove which has a substantially U-shaped section taken along the transverse direction thereof. As shown in FIG. 9, the tracking guide 4 may comprise a groove which is defined by sloping surfaces 18 and 20 and a flat bottom 22 so as to have a substantially inverted trapezoidal shape taken along the transverse direction thereof. The width of each of these tracking guides is set to be smaller than $W_0/3$. The information pits 12 are formed in these grooves 4 in the same manner as previously described.

When the tracking guide 4 shown in FIGS. 7, 8 or 9 is traced with the laser beam, an intensity $L_4$ of a laser beam reflected thereby is higher than the intensity $L_2$ of a laser beam reflected by the tracking guide 4 shown in FIG. 2 or 4, as shown in FIG. 10. The intensity $L_4$ falls within the range between the level $L_1$ of a laser beam reflected by the flat surface region 8 and the level $L_2$ of a laser beam reflected by the tracking guide 4 shown in FIG. 2 or 4. Therefore, the intensities $L_2$ and $L_3$ of laser beams reflected by the preformation pits 6 or the information pits 12 differ from that of a beam reflected by the tracking guide 4. Therefore, the preformation pits 6, the information pits 12 and the tracking guides 4 can be distinguished from each other in accordance with their light intensity levels.

The grooves as the tracking guides 4 shown in FIGS. 7 to 9 may be applied to an optical disk in which a tracking guide is continuously formed along the circumferential direction of the disk with no flat surface regions therebetween along the circumferential direction thereof. In this case, it is apparent that the preformation pits, information pits and tracking guide can be clearly distinguished from each other in accordance with light intensity levels.

Figure 11:
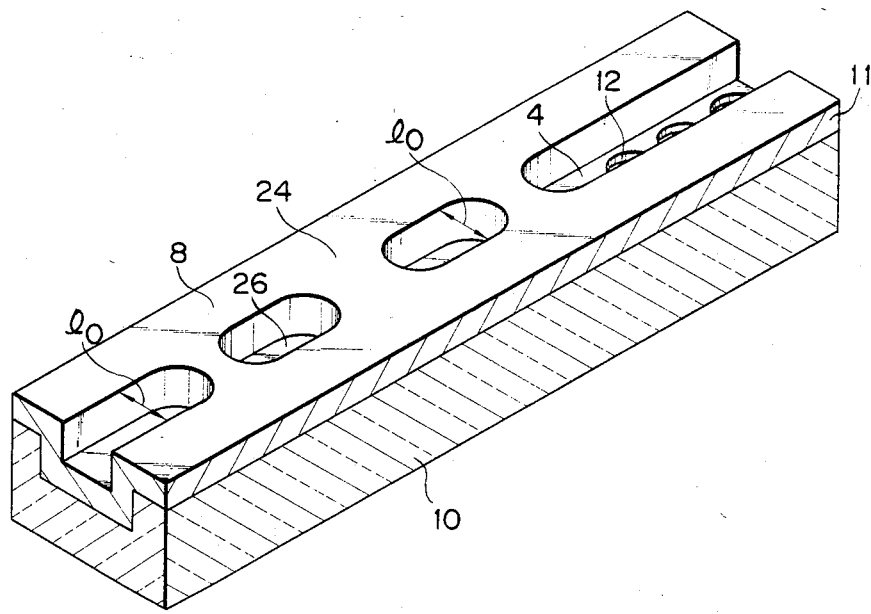
FIG. 11 is perspective view of part of the optical disk according to another embodiment of the invention.

As shown in FIG. 11, the preformat segments 6 may be defined by flat bridge sections 24 of the flat surface region 8. The bridge sections 24 are arranged between recesses 26 and the groove 4 as the tracking guide and the recess 26. The recesses 26 are formed on the light reflective layer 11 in the flat surface region 8 and have the depth $h_0$ same as that of the tracking guide 4 and preferably have the width $l_0$.

In the optical disk shown in FIG. 11, the tracking guides 4 and the array of the recesses 26 are properly traced or tracked and the code information is read out from the bridge sections 24 with the laser beam in a stable manner.

In the embodiment described above, the light reflective layer 8 is selectively melted to form the information pits 12 by irradiation with a high intensity laser beam, so as to prepare an information segment. However, it is not absolutely necessary to melt the layer 8. For example, the refractive index or reflectance of light of the layer 8 may be selectively changed by irradiation with a high intensity laser beam so as to prepare the desired information segment. It is also possible to allow the irradiated portions of the layer 8 to heave up, thereby preparing the desired information segment.

What is claimed is:

1. An optical disk comprising:
   a disk plate having a light reflective layer;
   a tracking guide spirally formed on said light reflective layer of said disk plate so as to establish a guide path for a laser beam irradiating said optical disk,
   said tracking guide including plural guide segments separated from one another along said guide path so as to define a respective plurality of flat light-reflective regions between adjacent ones of said guide segments,
   each said guide segment being defined by a groove having a predetermined depth $h_0$; and
   preformation pits formed by said light reflective layer of said disk plate and defined in respective ones of said light reflective regions, said preformation pits having a depth $h_0$ of substantially the same dimension as the predetermined depth $h_0$ of each said groove of said guide segment.

2. An optical disk according to claim 1, wherein the depth $h_0$ of each said groove of said guide segments and said preformation pits is given by:

$$\{(2n-1)/8 - 1/10\}\lambda \leq h_0 \leq \{(2n-1)/8 + 1/10\}\lambda,$$

where n is an integer and $\lambda$ is a wavelength of a laser beam irradiating said optical disk.

3. An optical disk according to claim 1, wherein the depth $h_0$ of each said groove of said guide segments and said preformation pits is given by:

$$(1/40)\lambda \leq h_0 \leq (9/40)\lambda,$$

where $\lambda$ is a wavelength of the laser beam irradiating said optical disk.

4. An optical disk according to claim 1, wherein the depth $h_0$ of each said groove of said guide segments and said preformation pits is about $\lambda/8$, respectively.

5. An optical disk according to claim 1, wherein each of said preformation pits has a width substantially the same as that of said groove grooves of said guide segments.

6. An optical disk according to claim 1, wherein each of said guide segments has a width $W_0/2$, where $W_0$ is a spot diameter of the laser beam irradiating said flat light-reflective regions of said optical disk.

7. An optical disk according to claim 1, wherein each of said preformation pits has a width of $W_0/2$, where $W_0$ is a spot diameter of the laser beam irradiating said flat light-reflective regions of said optical disk.

8. An optical disk according to claim 1, wherein each of said preformation pits has a width smaller than that of said groove of said guide segments.

9. An optical disk according to claim 8, wherein each of said preformation pits has a width $W_0/3$, where $W_0$ is a spot diameter of the laser beam irradiating said flat light-reflective regions of said optical disk.

10. An optical disk according to claim 1, further comprising information pits formed by removing the light reflective layer in said groove of selected ones of said guide segments.

11. An optical disk according to claim 1, wherein each guide segment has a V-shaped section.

12. An optical disk according to claim 1, wherein each said guide segment has a U-shaped section.

13. An optical disk according to claim 1, wherein each said guide segment has an inverted trapezoid section.

14. An optical disk comprising:
 a disk plate having a light reflective layer;
 a tracking guide spirally formed on said light reflective layer of said disk plate so as to establish a guide path for a laser beam irradiating said optical disk,
 said tracking guide including plural guide segments separated from one another along said guide path so as to define a respective plurality of flat light-reflective regions between adjacent ones of said guide segments,
 each said guide segment being defined by a ridge having a predetermined height $h_0$; and
 projections formed by said light reflective layer of said disk plate and projecting from predetermined ones of said light-reflective regions, said projections also having a height $h_0$ of substantially the same dimension as the predetermined height $h_0$ of said ridge of each said guide segment.

15. An optical disk according to claim 14, wherein the height of each said ridge and said first projections is given by:

$$\{(2n-1)/8-1/10\}\lambda \leq h_0 \leq \{(2n-1)/8+1/10\}\lambda,$$

where n is an integer and $\lambda$ is a wavelength of a laser beam irradiating said optical disk.

16. An optical disk according to claim 14, wherein the height of each said ridge and said projections is given by:

$$(1/40)\lambda \leq h_0 \leq (9/40)\lambda,$$

where $\lambda$ is a wavelength of the laser beam irradiating said optical disk.

17. An optical disk according to claim 14, wherein the height of each said ridge and said projections is preset at about $\lambda/8$ each.

18. An optical disk according to claim 14, wherein each said projection has a width substantially the same as that each of said ridge.

19. An optical disk according to claim 14, wherein each of said guide segments has a width $W_0/2$, where $W_0$ is a spot diameter of the laser beam irradiating said flat light-reflective regions of said optical disk.

20. An optical disk according to claim 14, wherein each said projection has a width $W_0/2$, where $W_0$ is a spot diameter of the laser beam irradiating said flat light-reflective regions of said optical disk.

21. An optical disk according to claim 14, wherein each of said projections has a width smaller than that of said ridge of each said guide segment.

22. An optical disk according to claim 21, wherein each of said projections has a width $W_0/3$, where $W_0$ is a spot diameter of the laser beam irradiating said flat light-reflective of said optical disk.

23. An optical disk according to claim 14, further comprising information pits formed by removing the light reflective layer on said ridge of predetermined ones of said guide segments.

24. An optical disk comprising:
 a disk plate having a light reflective layer;
 a tracking guide spirally formed on said light reflective layer of said disk plate so as to establish a guide path for a laser beam irradiating said optical disk,
 said tracking guide including plural guide segments separated from one another along said guide path so as to define a respective plurality of flat light-reflective regions between adjacent ones of said guide segments,
 each said guide segment being defined by a groove having a predetermined depth $h_0$;
 plural recesses formed by said light reflective layer of said disk plate and located in predetermined ones of said flat light-reflective regions, each said recess having a depth $h_0$ of substantially the same dimension as the predetermined depth $h_0$ of each said groove; and wherein
 said flat light-reflective regions include flat bridge sections defined (i) between said recesses and an adjacent one of said grooves, and (ii) between adjacent ones of said recesses said bridge sections representing code information.

25. An optical disk according to claim 24, wherein the depth $d_0$ of each said groove and said recesses is given by:

$$\{(2n-1)/8-1/10\}\lambda \leq h_0 \leq \{(2n-1)/8+1/10\}\lambda,$$

where n is an integer and $\lambda$ is a wavelength of a laser beam irradiating said optical disk.

26. An optical disk according to claim 24, wherein the depth $h_0$ of each said groove and said recesses is given by:

$$(1/40)\lambda \leq h_0 \leq (9/40)\lambda,$$

where $\lambda$ is a wavelength of the laser beam irradiating said optical disk.

27. An optical disk according to claim 24, wherein the depth $h_0$ of each said groove and said recesses is preset at about $\lambda/8$, respectively.

28. An optical disk according to claim 24, wherein each of said recesses has a width substantially the same as that of said groove.

29. An optical disk according to claim 24, wherein each of said guide segments has a width $W_0/2$, where $W_0$ is a spot diameter of the laser beam irradiating said flat light-reflective regions of said optical disk.

30. An optical disk according to claim 24, wherein each of said recesses has a width $W_0/2$, where $W_0$ is a spot diameter of the laser beam irradiating said flat light-reflective regions of said optical disk.

31. An optical disk according to claim 24, wherein each of said recesses has a width smaller than that of said groove.

32. An optical disk according to claim 31, wherein each of said recesses has a width $W_0/3$, where $W_0$ is a spot diameter of the laser beam irradiating said flat light-reflective regions of said optical disk.

33. An optical disk according to claim 24, further comprising information pits formed by removing the light reflective layer in predetermined ones of said groove of said guide segments.

* * * * *